(12) United States Patent
Su et al.

(10) Patent No.: US 12,464,220 B2
(45) Date of Patent: Nov. 4, 2025

(54) SYSTEMS, APPARATUS, AND METHODS FOR IMPROVING COMPOSITION OF IMAGES

(71) Applicant: Google LLC, Mountain View, CA (US)

(72) Inventors: Yu-Chuan Su, Mountain View, CA (US); Raviteja Vemulpalli, Seattle, WA (US); Lior Shapira, Mountain View, CA (US); Colvin Pitts, Mountain View, CA (US); Benjamin Weiss, Carpinteria, CA (US); Andy Rogers, Mountain View, CA (US)

(73) Assignee: Google LLC, Mountain View, CA (US)

( * ) Notice: Subject to any disclaimer, the term of this patent is extended or adjusted under 35 U.S.C. 154(b) by 190 days.

(21) Appl. No.: 18/251,655

(22) PCT Filed: Nov. 15, 2021

(86) PCT No.: PCT/US2021/059325
§ 371 (c)(1),
(2) Date: May 3, 2023

(87) PCT Pub. No.: WO2022/104181
PCT Pub. Date: May 19, 2022

(65) Prior Publication Data
US 2023/0421888 A1 Dec. 28, 2023

Related U.S. Application Data

(60) Provisional application No. 63/114,329, filed on Nov. 16, 2020.

(51) Int. Cl.
*H04N 23/63* (2023.01)
*G06T 7/20* (2017.01)
*H04N 23/60* (2023.01)

(52) U.S. Cl.
CPC ............ *H04N 23/632* (2023.01); *G06T 7/20* (2013.01); *H04N 23/64* (2023.01)

(58) Field of Classification Search
CPC ...... H04N 23/632; H04N 23/64; H04N 23/61; H04N 23/633; H04N 23/635; H04N 5/2228; G06T 7/20; G06T 2207/20081; G06T 2207/20084; G06T 2207/20092;
(Continued)

(56) References Cited

U.S. PATENT DOCUMENTS

2015/0178592 A1 6/2015 Ratcliff et al.
2019/0109981 A1* 4/2019 Zhang .................... H04N 23/64
2019/0174056 A1* 6/2019 Jung .................. H04N 1/00244

FOREIGN PATENT DOCUMENTS

EP 3 496 386 A1 6/2019

\* cited by examiner

*Primary Examiner* — Nhan T Tran
(74) *Attorney, Agent, or Firm* — MCDONNELL BOEHNEN HULBERT & BERGHOFF LLP

(57) ABSTRACT

Systems, apparatus, and methods are presented for improving the composition of images. One method includes receiving a first preview image of a scene and processing the first preview image using a first machine learning model to determine at least one direction to move a user device based on a composition score of the first preview image and at least one composition score of a plurality of candidate images. The method also includes detecting movement of the user device and receiving a second preview image of the scene after movement of the user device.

20 Claims, 7 Drawing Sheets

(58) Field of Classification Search
CPC ........ G06T 2207/30168; G06T 7/0004; G06N 3/045; G06N 3/048; G06N 3/08; G06V 10/82

See application file for complete search history.

SYSTEMS, APPARATUS, AND METHODS FOR IMPROVING COMPOSITION OF IMAGES

RELATED APPLICATIONS

This application is the US national phase under 35 U.S.C. § 371 of International Application No. PCT/US2021/059325, filed Nov. 15, 2021, which claims the benefit of U.S. Provisional Application No. 63/114,329, filed Nov. 16, 2020, the contents of which is hereby incorporated by reference in its entirety.

BACKGROUND

Unless otherwise indicated herein, the materials described in this section are not prior art to the claims in this application and are not admitted to be prior art by inclusion in this section.

Taking pictures and sharing them with friends has become an accepted norm in today's world of social communication. Various hand-held devices, such as mobile phones, mobile computing device, eye glasses, etc. may be equipped with cameras that allow users to take pictures of scenes, people, monuments, events, etc. and share them with their friends and family. Often times, when sightseeing or attending an important event, users sometimes end up with pictures that are non-optimal. For instance, pictures of monuments (for e.g., cathedrals, churches, large buildings, etc.), people, events, sights, etc. may not be symmetrical, buildings may be skewed, objects may not be optimally positioned in the scene, or, and in general, the captured pictures may not be of good quality and composition. It may not be apparent to some camera users, especially amateur or in-experienced users, when taking pictures, of how the pictures will turn out or the quality of the pictures until the pictures are viewed at a later time. Further, users may not have the expertise or knowledge required to capture well-composed images like professional photographers.

BRIEF SUMMARY

Embodiments of the present disclosure provide systems, methods and apparatus to enable a user of an image capture device to capture images of monuments, scenes, people, events, etc. that are of optimal composition and quality. The image capture device may be configured to analyze the composition of images captured by the image capture device and to provide suggestions or feedback to improve the composition of the images. The suggestions may guide or instruct the user to move the position of the image capture device and/or to adjust the zoom level of the image capture device to improve the composition of the image. It should be appreciated that the systems, methods, and apparatus of the present disclosure can be implemented in numerous ways. Several embodiments of the present disclosure are described below.

In one aspect, a method for improving composition of an image is described. The method includes receiving a first preview image of a scene and processing the first preview image using a first machine learning model to determine at least one direction to move a user device based on a composition score of the first preview image and at least one composition score of a plurality of candidate images. The method also includes detecting movement of the user device and receiving a second preview image of the scene after movement of the user device.

In another aspect, the present application describes an apparatus comprising a memory, an image sensor, and one or more processors. The one or more processors may be configured to receive a first preview image of a scene and process the first preview image using a first machine learning model to determine at least one direction to move a user device based on a composition score of the first preview image and at least one composition score of a plurality of candidate images. The one or more processor may also be configured to detect movement of the user device and receive a second preview image of the scene after movement of the user device.

In still another aspect, a non-transitory computer-readable medium storing instructions is disclosed that, when the instructions are executed by one or more processors, causes the one or more processors to perform operations. The operations may include receiving a first preview image of a scene and processing the first preview image using a first machine learning model to determine at least one direction to move the user device based on a composition score of the first preview image and at least one composition score of a plurality of candidate images. The operations may include detecting movement of the user device and receiving a second preview image of the scene after movement of the user device.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF DRAWINGS

Reference will now be made to the accompanying figures and flow diagrams, which are not necessarily drawn to scale, and wherein.

DETAILED DESCRIPTION

Figure 1:
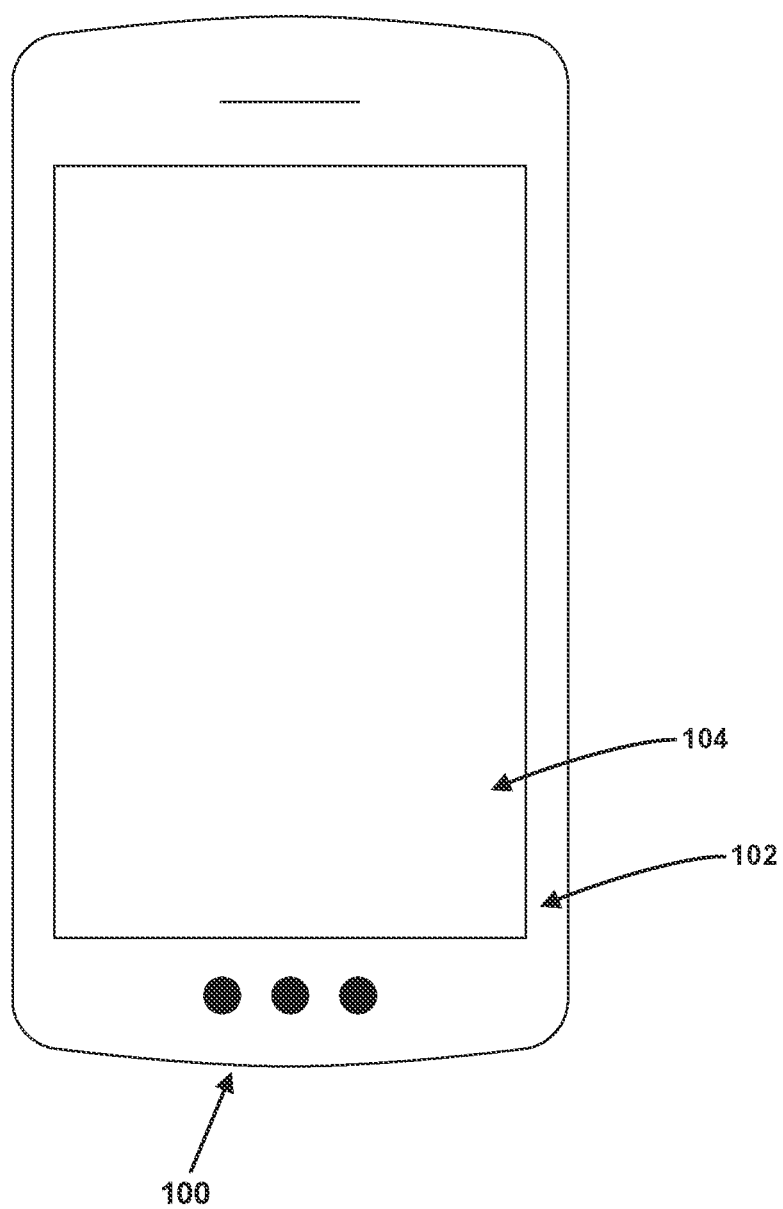
FIG. 1 depicts an illustration of a user device, according to an example embodiment.

Example methods, devices, and systems are described herein. It should be understood that the words "example" and "exemplary" are used herein to mean "serving as an example, instance, or illustration." Any embodiment or feature described herein as being an "example," "exemplary." and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

The following embodiments describe systems, apparatus, and methods that provide real-time evaluation of image composition to enable a user of an image capture device to capture images of monuments, scenes, people, events, etc. that are of optimal composition and quality. The image capture device may be configured to analyze the composition of the images captured by the image capture device and to provide guidance to aid the user for capturing well-composed images. The image capture device may generate suggestions or feedback for improving the quality of the composition of captured images. The suggestion may instruct the user to move the position of the image capture device and/or to adjust the zoom level of the image capture device to capture images. The suggestions may be in the form of text, audio commands, image overlays (animated or static), graphical indicia (e.g., icons, arrows, or other indicia), etc. that are presented to the user either on a display screen, through a speaker, or through other output mechanism/devices. When the composition of the image (e.g., preview image) reaches a desirable level, the image capture device may no longer provide suggestions to the user or may provide an indication that an image may be captured. The user may then trigger a capture an image of the scene with the image capture device. Thus, the image capture device may enable the user to capture quality pictures or images, allowing the user to enjoy the pictures of the event, monument, scene, etc., enriching the user's experience.

Referring now to the drawings, FIG. 1 depicts an illustration of a user device 100, according to an example implementation. The user device 100 may include an image capture device or camera. The user device 100 may be a mobile computing device, a smartphone, a tablet personal computer (PC), a mobile phone, an augmented reality head-mounted display, a digital camera, or any other device equipped with an image capture device. The augmented reality system may be in the form of a pair of eye glasses equipped with a camera.

The user device 100 may have a built-in or integrated display device or screen 102 for displaying a graphical user interface 104 during an image capture process. The user device 100 may be configured to enable a user to launch an application on the user device 100 which activates a camera (not shown) and displays a real-time image or preview image of the field-of-view of the camera. The real-time image may be continuously updated with new images generated from the camera, such that movement of the user device 100 may correspond in real-time to movement of the image being captured or detected by the camera. Thus, the image being shown on the display device 102 of user device 100 may be a real-time image (e.g., a preview image) capturing the field-of-view of the camera. The user can therefore position the camera of the user device 100 toward a scene and immediately view an image or picture of the scene on the display device 102 of the user device 100.

Once the user device 100 captures a preview or real-time image of a scene, the user device 100 may be configured to analyze and/or process the preview image to determine the composition and/or quality of the preview image. Based on the analysis, the user device 100 may be configured to provide real-time suggestions or recommendations for improving the quality of the composition of the preview image captured by the user device 100. The suggestions may provide guidance or instructions to the user to move the position of the user device 100 and/or to adjust the camera zoom level of the user device 100. For example, if some of the objects in the preview image are not properly centered, the user device 100 may suggest, in the form of guidance or feedback, adjusting the position and/or camera zoom level of the user device 100. In some embodiments, the user device 100 may display the suggestions on the display screen 102 of the user device 100. Some of the suggestions for adjusting the position of the user device may indicate moving the position or direction of the user device up, down, left, right, etc. Further, some of the suggestions for adjusting the camera zoom settings may include zoom in, zoom out, etc. As such, the user may move the user device 100 or adjust the camera zoom level according to the suggestions to improve the composition of the image (e.g., preview image) being captured by the user device 100.

The various suggestions and/or feedback provide guidance or feedback to the user for capturing optimal compositional images may be provided in different formats. For example, the suggestions may be visual, audio, or vibratory indications, such as icons, arrows, text, image overlays, etc. In one embodiment, an arrow or indicator may be displayed on the display device 102 of the user device 100 to provide guidance or instruction to move the position of the user device 100 in one or more directions and/or to adjust the camera zoom level (e.g., zoom in or out) of the user device 100. In other embodiments, the suggestions may be provided in a viewfinder of a camera. Further, the user may be provided with options to select the suggestion format thereby providing greater flexibility to the user for controlling the way the user desires to receive suggestions.

When the user moves or changes the position of the user device 100 or adjusts the camera zoom level of the user device in accordance with the suggestions, the user device 100 may continue to provide updated suggestions or feedback. The updated suggestions may to continue to aid or guide the user for adjusting the position of the user device 100 and/or adjusting the camera zoom level to improve the composition of the image (e.g., preview image) being captured by the user device 100. Once the user device 100 no longer provides a suggestion or indication that a well-composed image may be captured, the user may press a button or activate a camera application to capture an improved image of the scene. As a result, the user device 100 may enable a user, even an amateur user of a camera, to capture quality pictures or images.

FIGS. 2a-2d illustrate various suggestions provided or displayed by a user device, such as the user device 100 of FIG. 1, based on the real-time images (e.g., preview image) of the field-of-view of the user device 100. The real-time images depicted in FIGS. 2a-2d are exemplary and should not be considered restrictive or limiting. To capture preview images, the user may activate a camera application on the user device 100 and may focus the camera on a real-world scene/view that is of interest to the user. When the camera application is activated, the user device 100 may detect an image that the camera is focusing on, render the image on a display device of the user device 100, store the image in cache memory, and send a signal to one or more modules (e.g., feedback modules) within the user device 100 for further processing of the image.

Figures 2A, 2B, 2C, 2D:
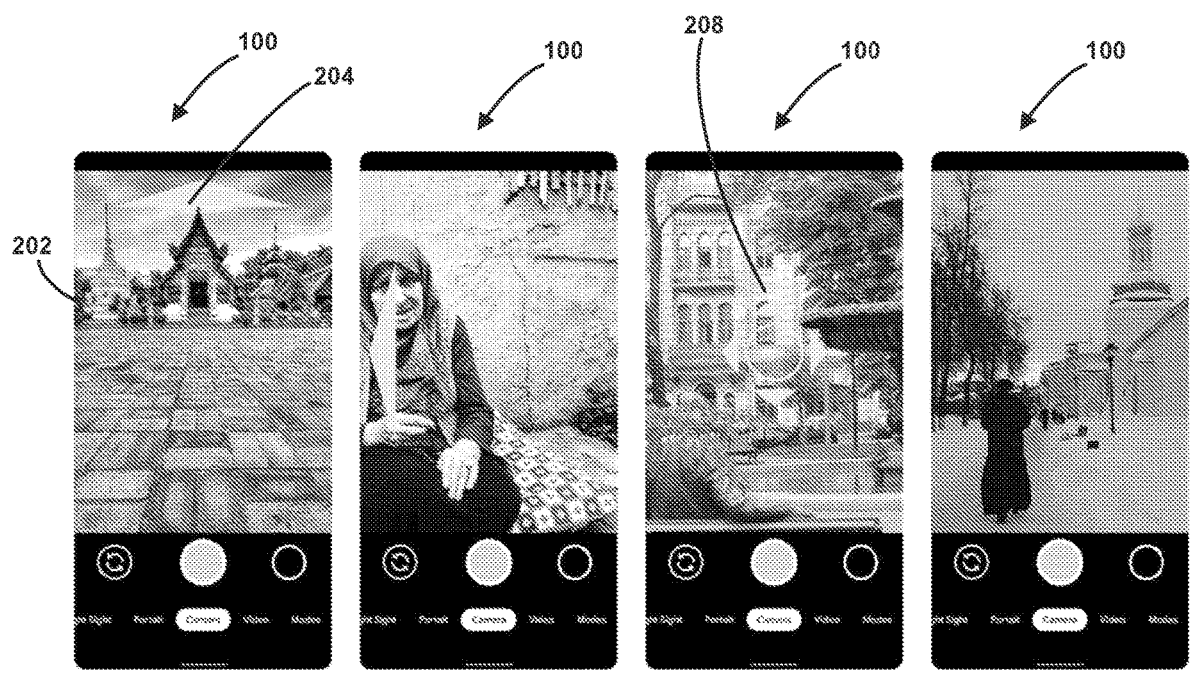
FIG. 2 depicts illustrations of example images displayed on a user device along with various suggestions provided by the user device, according to an example embodiment.

FIG. 2a illustrates a screen rendition of a preview image 202 of an exemplary image of a scene captured or detected by the user device 100. As shown in FIG. 2a, the preview image may include a plurality of objects, such as buildings. The preview image of the scene as captured by the camera of user device 100 is rendered on the display device or screen 204 of the user device 100. During the capture of preview images, the user has merely pointed the camera of the user device 100 at the scene and has not committed to capturing an image of the scene.

The user device 100 may be configured to analyze or process the preview image to identify or detect features of the image. Based on the analysis, the user device 100 may provide suggestions or feedback to improve the composition of the preview image. For example, if some of the objects in the image are non-symmetrical, incomplete, and/or too large or small, the user device 100 may provide suggestions or feedback to guide or instruct the user to adjust the position of the user device 100 and/or adjust the camera zoom level of the user device 100. The suggestions may indicate or instruct the user to move the user device 100 upward or downward, to move the user device 100 to the left or right, to adjust angle of the user device 100, to rotate the user device, etc. Further, the suggestions may notify or instruct a user to increase or decrease the camera zoom level (e.g., zoom in or zoom out). In some embodiments, representations of the suggestions may be provided on the display device or screen of the user device 100 so that the user of the user device 100 may follow the suggestions in order to obtain optimal image composition.

As illustrated in FIG. 2a, the suggestion 204 may be provided by the user device 100 in a visual format (e.g., graphical information) displayed on a portion of the display device. The suggestion 204 may also overlay the image. In this example, the suggestion 204 in FIG. 2a indicates that the user should move the user device 100 (e.g., camera) upward to capture an image of scene (i.e., the building). Based on the suggestion, the user may adjust the position of the user device 100 to improve the composition of the captured image. In other examples, the user device 100 may provide suggestions to the user to move the user device 100 in other directions, such as downward, to capture the image. The suggestions may include textual information, visual information, audio information, etc. It should be noted that the various formats used for providing suggestions are exemplary and should not be considered restrictive. Other formats may be used so long as it allows the user to follow the suggested directions or guidance.

The suggestions may be determined by the user device 100 based on a composition score of the real-time image (e.g., preview image) and composition scores of candidate images. The composite score may identify the quality of the detected or captured image and may be computed in accordance with trained models of the user device. The candidate images may be generated by simulating the capture of an image by the user device at different positions as further described below. For example, the user device 100 may determine that the composition of the real-time image may be improved by moving the user device 100 in a particular direction based on the candidate images. As a result, when the position of the user device 100 is moved according to the suggestions, the composition score of a captured image may be increased.

When the user moves the user device 100 in accordance with the suggestions, the user device 100 may continue to display real-time images (e.g., preview images) on the display device of the user device 100. Suggestions may also be continued to be provided on the display device or screen of the user device 100 to guide or instruct the user to move the user device 100 in a particular direction or to adjust the camera zoom setting of the user device 100 to improve the composition of the image. Further, the user device 100 may dynamically determine the composition score of the newly captured images (e.g., preview images) to account for the adjustment in the position or settings of the camera of the user device 100. Based on the newly captured images, the user device 100 may provide suggestions to adjust the position or the camera settings of the user device 100. After the user moves the user device 100 in accordance with the suggestions provided by the user device 100, the user of may trigger the capture of an image with improved composition.

FIG. 2b illustrates an image displayed on a display device of the user device 100 where the objects (e.g., people) are positioned toward the left-side of the preview image and are not fully visible. As a result, the user device 100 may provide a suggestion 206 to guide or instruct the user to move the user device 100 to the left to improve the composition of the captured image. The suggestion 206 provided by the user device 100 may be in the form of graphical content. The suggestion may also be, in other embodiments, in the form of textual content, audio content, or haptic content. Further, the user device 100 may provide suggestions to the user to move the position of the user device 100 in any suitable direction (e.g., a right direction) and/or to increase or decrease the camera zoom level of the user device 100.

When the user moves the user device 100, the user device 100 may continue to display a newly captured images (e.g., real-time or preview images) on the display device. Suggestions may also be continued to be provided on the display device of the user device 100 during movement to guide or instruct the user to move the user device 100 in a particular direction in order to improve the composition of the image. For example, based on the newly captured images, the user device 100 may provide suggestions to adjust the position of the user device 100. Further, the user device 100 may dynamically determine the composition score of the newly captured images to account for the adjustment in the position of the user device 100. After the user moves the user device in accordance with the suggestions provided by the user device 100, the user of the user device 100 may trigger the capture of an image having improved composition.

FIG. 2c illustrates a real-time or preview image displayed on a display device of the user device 100 where the camera of the user device 100 has been zoomed in too far. As a result, the objects in the image may be too big and some of the objects (e.g., people) may be only partially visible. The user device 100 may analyze and/or process the preview image and determine that the camera zoom level may be adjusted to improve the composition of image. The user device 100 may provide a suggestion 208 to notify or guide the user to decrease the camera zoom level of the user device 100. In response, the user may adjust the camera zoom level of the user device to improve the composition of the preview image. The suggestion provided by the user device 100 may be in the form of graphical content. In some embodiments, the suggestion may be in the form of text content, audio content, or haptic content. Further, when the user device 100 determines that the objects in the image are too small, the user device 100 may provide suggestions to notify or instruct the user to increase the zoom level (e.g., zoom-in) so as to allow the objects to be visible in an optimal manner.

While the user adjusts the camera zoom level of the user device 100, the user device 100 may continue to display a real-time or preview image on the display device. Further, the user device 100 may also continually provide suggestions or feedback during the adjustment of the camera zoom level. Further, the user device 100 may dynamically determine the composition score of the preview image to account for the zoom level adjustment of the camera of the user device 100. After the user moves the user device 100 in accordance with the suggestions provided by the user device 100, the user may trigger the capture of an image with improved composition.

FIG. 2d illustrates an optimal real-time or preview image displayed on a display device of the user device 100. When the user device 100 analyzes and/or processes the preview image and determines that the image has an acceptable or desirable image composition, the user device 100 may not provide a suggestion to the user. Alternatively, the user device 100 may provide an indication to the user that the image has a desirable composition. As such, the user may trigger the capture of an image.

Figure 3:
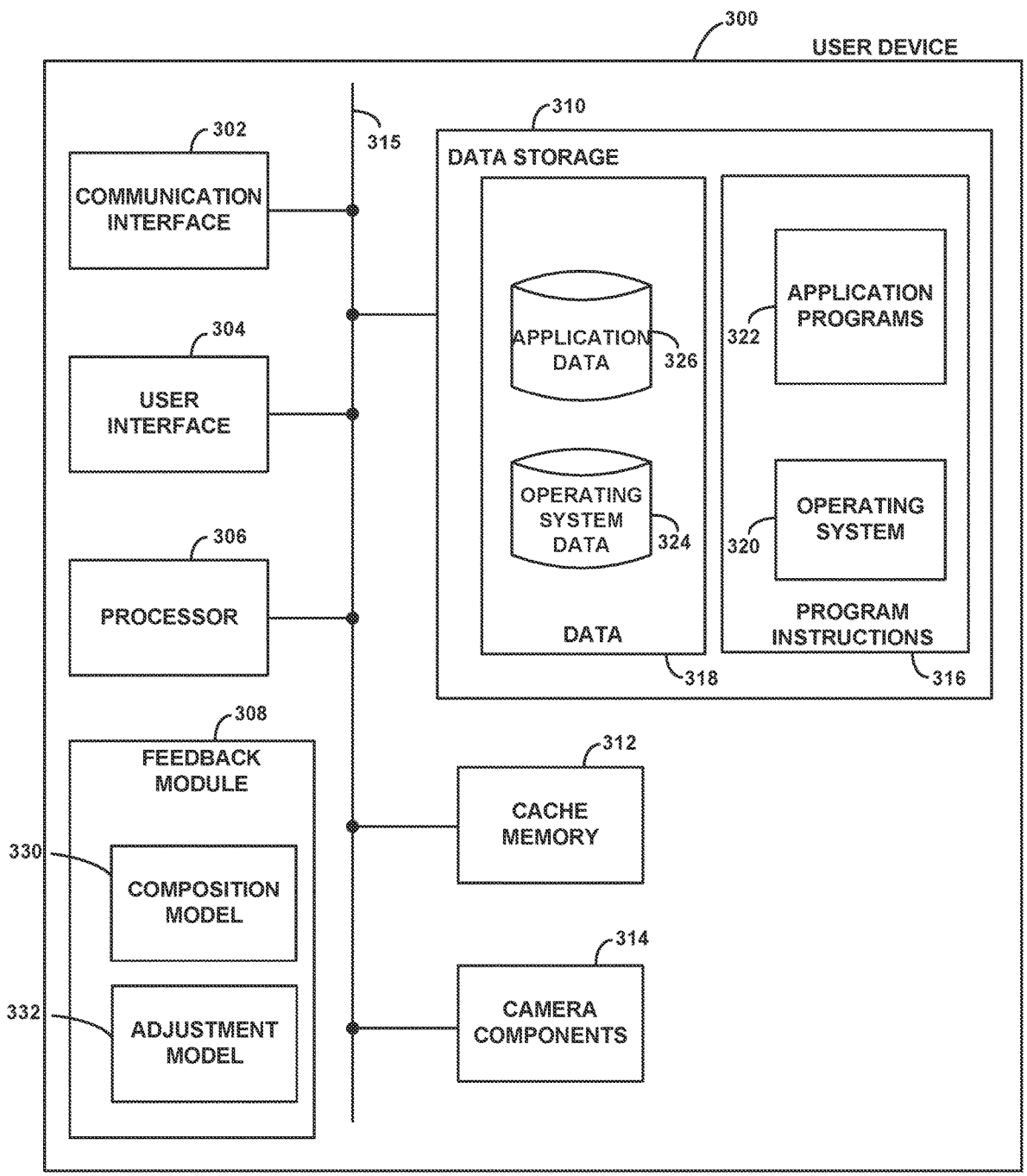
FIG. 3 is a simplified block diagram of a user device, in accordance with an example embodiment.

FIG. 3 illustrates a user device or image capture device 300 that employs a feedback module or engine for analyzing and/or processing image data of an image. The user device 300 may be any camera-equipped device, such as a camera (i.e., digital camera), a tablet personal computer (PC), a mobile phone, a wearable computing device (e.g., a pair of eyeglasses equipped with a camera, a head-mounted display, and/or an augmented reality display), etc. As shown in FIG. 3, the user device 300 may include a communication interface 302, a user interface 304, a processor 306, a feedback module or engine 308, data storage 310, a cache memory 312, and camera components 314, all of which may be communicatively linked or coupled together by a system bus, network, or other connection mechanism 315.

The communication interface 302 of the user device 300 may function to allow the user device 300 to communicate, using analog or digital modulation, with other devices, access networks, and/or transport networks. Thus, the communication interface 302 may facilitate circuit-switched and/or packet-switched communication, such as POTS communication and/or IP or other packetized communication. For instance, the communication interface 302 may include a chipset and antenna arranged for wireless communication with a radio access network or an access point. Also, the communication interface 302 may take the form of a wireline interface, such as an Ethernet, Token Ring, or USB port. The communication interface 302 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over the communication interface 402. Furthermore, the communication interface 402 may comprise multiple physical communication interfaces (e.g., a Wifi interface, a BLUETOOTH® interface, and a wide-area wireless interface).

The user interface 304 of the user device 300 may function to allow the user device 300 to interact with a human or non-human user, such as to receive input from a user and to provide output to the user, such as suggestions and/or feedback to aid or instruct a user to move the position of the user device 300 and/or to adjust a camera zoom level of the user device 300 to captured images with improved composition. The user interface 304 may include input components such as a keypad, keyboard, touch-sensitive or presence-sensitive panel, computer mouse, trackball, joystick, microphone, still camera and/or video camera. The user interface 304 may also include one or more output components such as a display screen (which, for example, may be combined with a touch-sensitive panel), CRT, LCD, LED, a display using DLP technology, printer, light bulb, and/or other similar devices, now known or later developed. The user interface 304 may also be configured to generate audible output(s), via a speaker, speaker jack, audio output port, audio output device, earphones, and/or other similar devices, now known or later developed. In some embodiments, the user interface 304 may include software, circuitry, or another form of logic that can transmit data to and/or receive data from external user input/output devices. Additionally or alternatively, the user device 300 may support remote access from another device, via the communication interface 302 or via another physical interface (not shown).

In some embodiments, the user interface 304 of the user device 300 may include a display device or screen configured to display real-time or preview images captured by the user device 300. The user interface 304 may also serve as a viewfinder for still camera and/or video camera functions supported by the user device 300. Additionally, the user interface 104 may include one or more buttons, switches, knobs, and/or dials that facilitate the configuration and focusing of a camera function and the capturing of images (e.g., capturing a picture). In some implementations, some or all of these buttons, switches, knobs, and/or dials are implemented as functions on a touch or proximity sensitive panel.

The processor 306 of the user device 300 may comprise one or more general purpose processors (e.g., microprocessors) and/or one or more special purpose processors (e.g., DSPs, GPUs, FPUs, network processors, or ASICs). The processor 306 may be capable of executing program instructions 316 (e.g., compiled or non-compiled program logic and/or machine code) stored in the data storage 308 to carry out the various functions described herein.

The data storage 310 of the user device 300 may include one or more volatile and/or non-volatile storage components, such as magnetic, optical, flash, or organic storage, and may be integrated in whole or in part with the processor 306. The data storage 310 may include removable and/or non-removable components. Further, the data storage 310 may include a non-transitory computer-readable medium, having stored thereon program instructions that, upon execution by user device 300, cause the user device 300 to carry out any of the methods, processes, techniques, and/or functions disclosed in this specification and/or the accompanying drawings. The execution of the program instructions 316 by the processor 306 may result in the processor 306 using data 318.

By way of example, the program instructions 316 may include an operating system 320 (e.g., an operating system kernel, device driver(s), and/or other modules) and one or more application programs 322 (e.g., address book, email, web browsing, social networking, and/or gaming applications) installed on user device 300. Similarly, the data 318 may include operating system data 324 and application data 326. The operating system data 324 may be accessible primarily to the operating system 320, and the application data 326 may be accessible primarily to one or more of application programs 322. The application data 326 may be arranged in a file system that is visible to or hidden from a user of the user device 300.

The application programs 322 may communicate with the operating system 320 through one or more application programming interfaces (APIs). These APIs may facilitate, for instance, the application programs 322 reading and/or writing the application data 326, transmitting or receiving information via the communication interface 302, receiving or displaying information on the user interface 304, and so on.

In some vernaculars, the application programs 322 may be referred to as "apps" for short. Additionally, the application programs 322 may be downloadable to the user device 300 through one or more online application stores or application markets. However, the application programs 322 can also be installed on the user device 300 in other ways, such as via a web browser or through a physical interface (e.g., a USB port) on the user device 300.

The cache memory 312 of the user device 300 may be used as temporary storage for data that is currently being processed by the processor 306 or the feedback module 308, frequently used data, and data that has not yet been committed to memory. The cache memory 312 may be constructed from a volatile or nonvolatile memory.

The camera components 314 of the user device 300 may include, but are not limited to, an aperture, shutter, recording surface (e.g., photographic film and/or an image sensor), lens, and/or shutter button. The camera components 314 may be controlled at least in part by software executed by the processor 306. Further, the camera components 314 may include multiple camera systems, which each include an aperture, shutter, recording surface lens, image sensor, processor, and/or shutter button.

The feedback module or engine 308 of the user device 300 may generate feedback or suggestions to guide or instruct a user to adjust the positon and/or camera zoom level of the user device 300 to improve the image composition of captured images. The feedback module 308 may comprise one or more general purpose processors (e.g., microprocessors) and/or one or more special purpose processors (e.g., DSPs, GPUs, FPUs, network processors, or ASICs). In some embodiments, the feedback module 308 may be integrated with the processor 306. The feedback module 308 may be capable of executing program instructions 316 (e.g., compiled or non-compiled program logic and/or machine code) stored in the data storage 308 to carry out the various functions described herein.

The feedback module 308 of the user device may include a composition model 330 (e.g., scoring model) and an adjustment model 332 (e.g., adjustment prediction model). The composition model 330 of the user device 300 may compute composition scores or measurements that identify a rating or quality of the composition of the images captured or detected by the user device 300 (e.g., real-time or preview images). For example, the composition model 330 may rate the composition quality of an image (e.g., preview image). Further, the composition model 330 may generate pseudo or estimated ground truth for tasks or operation implemented by the adjustment model 332 as further described below. In some embodiments, the composition model 330 may be implemented on another device or platform and may train the adjustment model as further described below.

Figure 4:
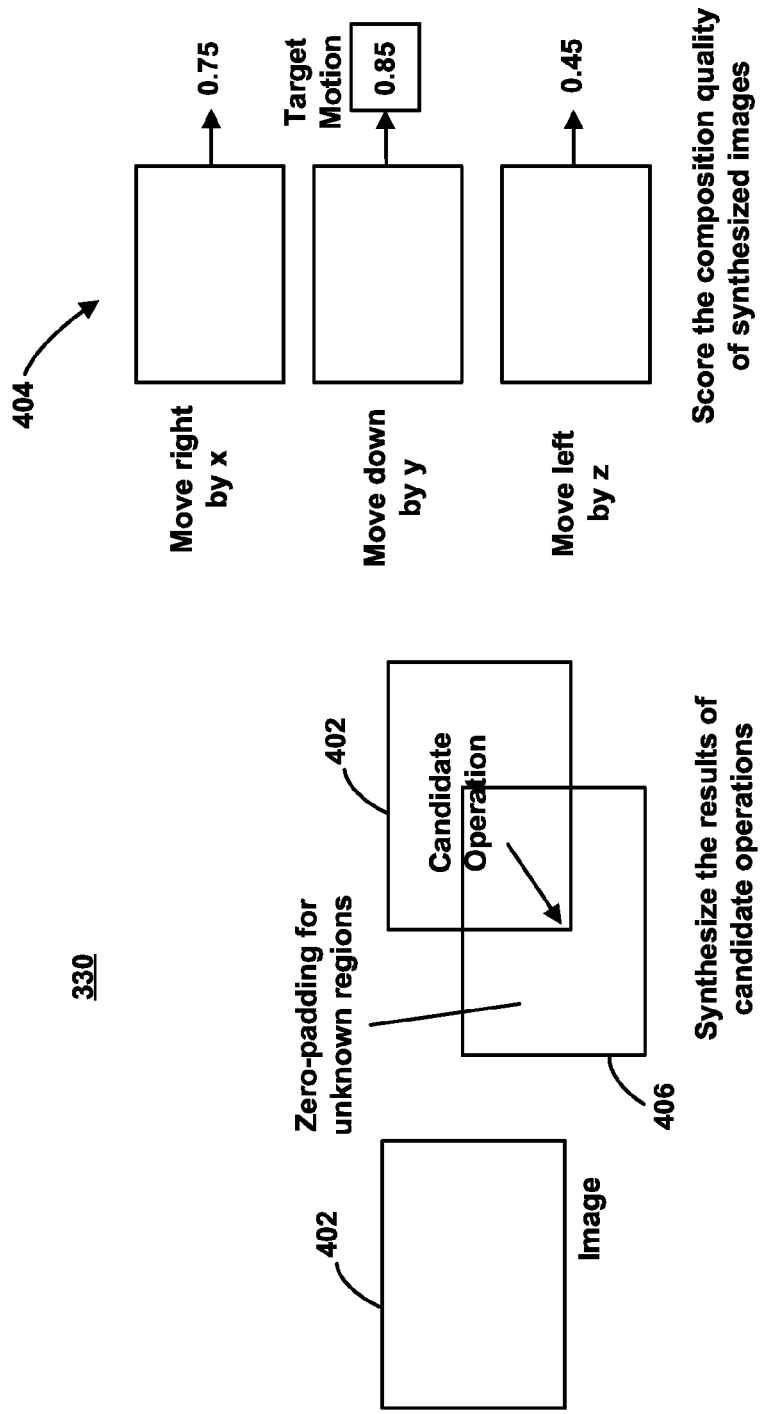
FIG. 4 illustrates a simplified block diagram of a machine learning model, in accordance with an example embodiment.

As shown in FIG. 4, the composition model 330 receives an image 402 from a camera of the user device 300 and generates a plurality of candidate images 404 based on the received image 402. The candidate images 404 may be generated by simulating the capturing of the received image 402 at different camera positions and/or movements of the user device 300. For example, the composition model 330 may slide a window 406 having the same dimensions (e.g., same size) as the image 402 across subsets or portions of the received image 402 to generate the candidate images 404. In one embodiment, the candidate images 404 may be generated by simulating movements of the user device (e.g., up, down, right, and left) by a determined percentage or distance for capturing the received image. Thus, each candidate image may include a subset or portion of the received image 402. The remaining portions of the candidate image may be synthesized. For example, pixels of the candidate image beyond or outside the received image 402 may be zero-padded as further described below. Further, the candidate images may also be generated by simulating adjustments of the camera zoom level (e.g., zoom in or out) by a determined percentage or distance for capturing the received image. The composition model 330 may score the composition quality of each candidate image and may select a candidate image from the candidate images having the highest composition score as the pseudo or estimate ground truth. The candidate image having the highest composite score has the best composition quality of the candidate images and may be outputted to the adjustment model 332. The composite scores generated by the composition model 330 may be used to train the adjustment model 332.

The composition model 330 may be implemented using one or more machine-learning models or neural network architectures. For example, the composition model 330 may be implemented using a convolutional neural network (CNN) architecture, such as MobileNet. A MobileNet may be based on an architecture that uses depth wise separable convolutions to build light weight deep neural networks. In one implementation, the composition model 330 includes one or more convolution layers, a spatial pyramid pooling layer (e.g., 1×1, 2×2, and 5×5 pooling layers), and three fully connected (FC) layers. The first and second FC layers may have 1,024 nodes with a rectified linear activation function (ReLU) and the third FC layer may have one node with sigmoid activation. The third FC layer may be utilized to output the pseudo or estimated ground truth data.

The composition model 330 may be trained to learn a hierarchy of composition information based on feature information of the training images. Because the goal of a composition model $M_c$ is to compare the results (e.g., candidate images) of different camera movements, the composition model Mc may be trained using a pairwise ranking loss function. In this approach, let a positive image and negative image ($I_p$, $I_n$) be an image pair capturing the same scene where the positive image $I_p$ has a better composition than the negative image In. The composition model $M_c$ is trained by minimizing the binge loss:

$$L=\max(0,\delta+M_c(I_n)-M_c(I_p)) \quad (1)$$

where $M_c(I) \in R$ is the rating for image I by $M_c$ and $\delta$ is a given margin. The ground truth for the composition model Mc may be a binary label for each image pair and may be easier to obtain compared with a motion label. In fact, the binary label may be generated from existing datasets without additional manual effort.

In some implementations, supervised data may be used for training the composition model $M_c$ to improve image composition. For example, image cropping datasets may be used for training the composition model $M_c$. Most existing image cropping datasets contain annotations in one of the two following formats. The first format provides relative annotations between candidate crops. Given a list of N candidate crops in an image, a relative score may be annotated for each crop that ranks the candidate crops based on their quality. This may lead to (N*(N−1))/2 image pairs with relative quality annotation, and these image pairs may be directly used for training the composition model Me. In each training iteration, N candidate crops may be sampled from one image and the ranking loss may be averaged over the (N*(N−1))/2 pairs as loss L1.

The second format of the annotation provides the best crop for each image. Let $(c_x, c_y, w, h)$ be the best crop represented as a bounding box in the image, where $(c_x, c_y)$ and (w, h) are the bounding box center and dimension respectively. Assuming that the ground truth crop has the optimal composition locally, the ground truth crop may be taken as the positive image $I_p$. The negative image In may be generated by perturbing the bounding box:

$$(cx+w*o_x, c_y+h*o_y, w+w*o_z, h+h*o_z) \quad (2)$$

where ox, oy, oz are the magnitude of vertical shift, horizontal shift, and zooming perturbation respectively. In each training iteration, N images and perturbations may be sampled to generate N image pairs and their average ranking loss $L_p$ may be computed. The perturbation may be restricted such that the negative image In is a crop inside the image.

While the annotation for cropping may be easier to obtain compared with annotation for camera movement, collecting the annotation may still time consuming and costly. Existing image cropping datasets may contain around 1 k-10 k images, which may be much smaller than datasets designed for tasks such as object detection or scene recognition. To increase the number of training data, unsupervised data may also be used for training the composition model. For example, images or photos taken by professional photographers may be used to train the composition model. These photos are usually well-composed and can be easily collected from the internet at scale.

Similar to generating image pairs from the ground truth crop, the well-composed image may be designated as the positive image and a random perturbation may be applied to generate the negative image. The well-composed image may be transformed into a crop by setting $(c_x, c_y)$ and (w, h) to the image center and dimension respectively. The crop may be then randomly perturbed using Equation 2 above in order to generate the negative image In. Unlike the supervised data, however, the perturbed crop may be allowed to go beyond the well-composed image where the pixels beyond the original image are zero-padded. N image pairs may be generated from N well-composed photos in each iteration and their average ranking loss Lu may be computed. The composition quality model may be trained on the supervised and unsupervised data jointly by minimizing the loss:

$$L=L_1+L_p+L_u+L_{reg} \quad (3)$$

where $L_{reg}$ is the $L_2$ regularization.

Because some negative images or samples in the unsupervised data may contain pixels that are not in the original or input image, the composition model Mc may give a low score to any image that contains zero-padded pixels regardless of the content. As a result, the model may prefer camera movements that reduce the field-of-view of the original image, i.e. move forward, zoom in, etc. To address this problem, two data augmentations may be introduced for the composition model $M_c$. Let si be a random number in [0.0, 0.5] for i∈ {x, y, z}. The first augmentation may randomly choose $s_y*h$ rows either at the top or bottom and $s_x*w$ columns at the left or right of the image and may replace the pixel values in the selected columns and rows with zero.

Similarly, the second augmentation randomly may choose $s_z*h$ rows and $s_z*w$ columns at both sides of the image and may replace the pixel values with zero. One of the two augmentations may be randomly applied to the positive samples in the unsupervised data and all samples in the supervised data. The two augmentations may introduce the same zero-padding patterns as that caused by the shifting and zooming perturbation respectively and reduce the bias in the composition model $M_c$.

The adjustment model 332 of the feedback module 308 determines whether a suggestion should be provided to a user of the user device 300. The adjustment model 332 may also determine movements of the user device 300 to improve the composition of the captured or detected images (e.g., real-time or preview images). Further, the adjustment model 332 may also determine adjustments to the camera zoom setting of the user device to improve the composition of captured or detected images.

The adjustment model 332 may be implemented using a machine-learning model or a neural network architecture. For example, the adjustment model 332 may be implemented using a convolutional neural network architecture, such as a MobileNet. In one implementation, the adjustment model 332 includes one or more convolution layers, a spatial pyramid pooling layer (e.g., 1×1, 2×2, and 5×5 pooling layers), and three fully connected (FC) layers. The first and second FC layers have 1,024 nodes with ReLU activation and the third FC layer has one node with sigmoid activation. The composite scores generated by the composition model 330 may be used to train the adjustment model 332.

Figure 5:
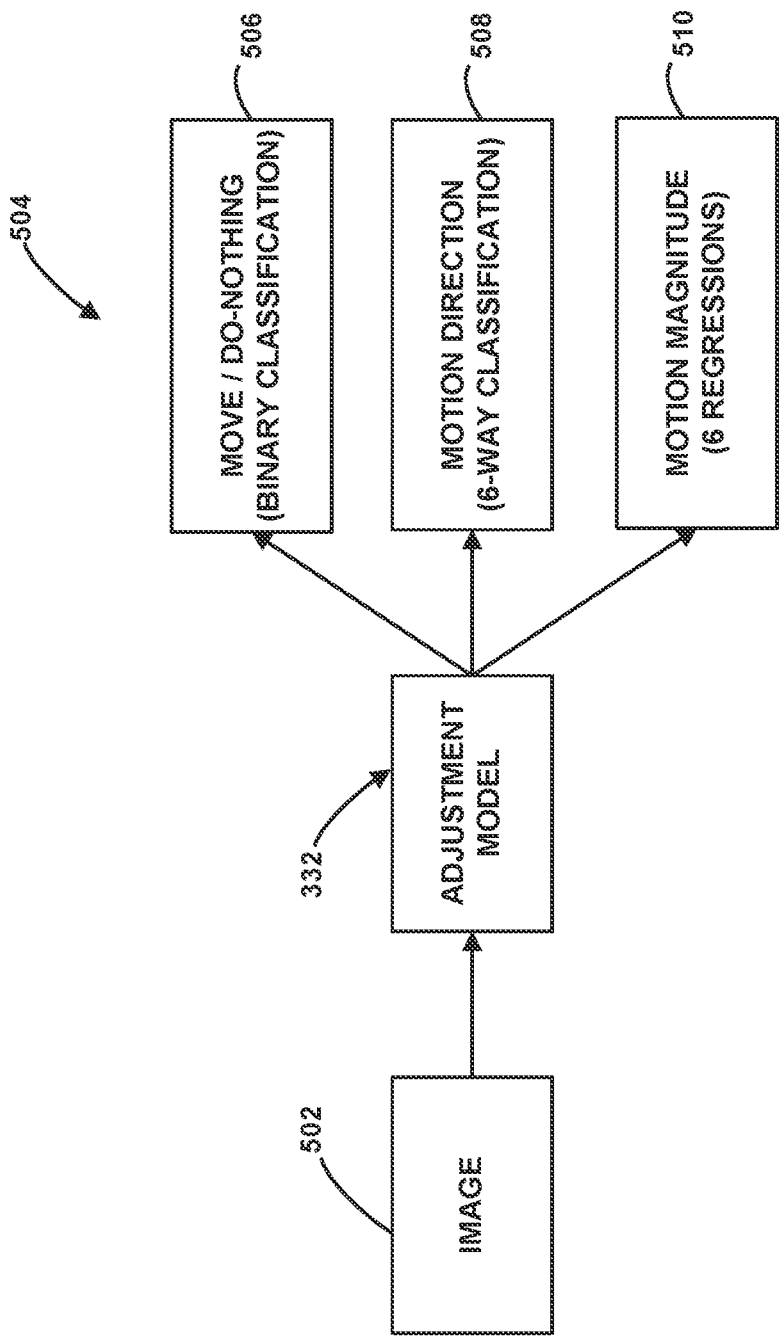
FIG. 5 illustrates a simplified block diagram of a machine learning model, in accordance with an example embodiment.

As shown in FIG. 5, the adjustment model 332 receives an image 502 (e.g., a real-time or preview image) captured or detected by a camera of the user device and processes the image to generate a plurality of outputs. The adjustment model 332 may perform or implement three sub-tasks or predictions 504. For example, the adjustment model may perform a first sub-task 506 that determines whether the adjustment model 332 should provide a suggestion or not. The suggestion may be triggered (i.e., $y_s^T=1$) if there exists a candidate camera movement (e.g., a candidate image) that will improve the composition of the image. Therefore, a binary predictor for $y_s^T \in \{0, 1\}$ may be defined using a hinge loss:

$$L_s=L_{hinge}(y_s^T, y_s) \quad (4)$$

Given that the adjustment model 332 should provide a suggestion, the adjustment model 332 may perform a second sub-task that determines which camera movement should be suggested. Assume that there exists M candidate camera movements and let $y_d^T \in \{0, 1\}M$ be the indicator vector for the target camera movement. A camera movement predictor is learned as a multi-class classifier with loss function:

$$L_d=y_s^T L_{cross-entropy}(y_d^T, y_d) \quad (5)$$

where $y_d \in R^M$ represents the predicted probability of each candidate movements. Finally, the adjustment model 332 may perform a third sub-task that determines the magnitude of the camera movement and learns a regression function using L1 loss:

$$L_m = y_s^T \sum_{i=1}^{M} y_{d,i}^T \|y_{m,i}^T - y_{m,i}\|, \quad (6)$$

where $y^T_{m,i}$ is the magnitude of candidate movement i. Further, a regression function may be learned for each candidate movement.

In this example, six candidate camera movements may be targeted, i.e. move left/right/up/down and zoom in/out, and M may be equal to 6 (e.g., M=6). The predictors for ys, yd, ym may be learned as three readout heads on top of a shared CNN backbone and they may be train jointly by optimizing the loss:

$$L = L_s + L_d + L_m + L_{reg} \quad (7)$$

Next, the target labels $y_s^T$, $y_d^T$, $y_m^T$ may be generated using the composition model Mc. In this approach, let $I_0$ be the original image and $O_i$ for i={1 . . . M} be the candidate camera movements. Each $O_i$ may be applied to $I_0$ with magnitudes mj and the result Ii,j may be synthesized. Ii,j may be synthesized using the same method as distorting the well-composed image as described above. Next, the composition model Mc may be evaluated on each Ii,j and find the one with the optimal composition quality:

$$(i_{max}, j_{max}) = \arg \max_{i,j} M_c(I_{i,j}). \quad (8)$$

where $y_s^T$ is defined as:

$$y_s^T = I[M_c(I i_{max} j_{max}) - M_c(I_0) \geq \Delta] \quad (9)$$

for a given threshold $\Delta$. Further, $y_d^T$ and $y_m^T$ may be defined accordingly:

$$(y_{d,i}^T, y_{m,i}^T) = \begin{cases} (1, m_{j_{max}}), & \text{if } i = i_{max} \text{ and } y_s^T = 1 \\ (0, 0), & \text{otherwise.} \end{cases} \quad (10)$$

As such, the suggestion may be triggered only if the composition quality improves more than selected amount (e.g., a threshold amount), and the composition model $M_c$ suggests the movement and magnitude that leads to the maximum improvement on the estimated composition quality. While it is possible to generate the suggestion using the composition model 330, it requires synthesizing and evaluating the composition model 330 on multiple images and incurs a high computational cost at test time. The computational cost increases linearly with respect to the number of candidate movements and sampled magnitudes. Because the suggestion is provided while users are composing photos, it may be important to reduce the computational cost so that the composition model 330 and/or the adjustment model 332 can run in real time on peripheral devices, such as the user device 100 of FIG. 1 or the user device 300 of FIG. 3.

Figure 6:
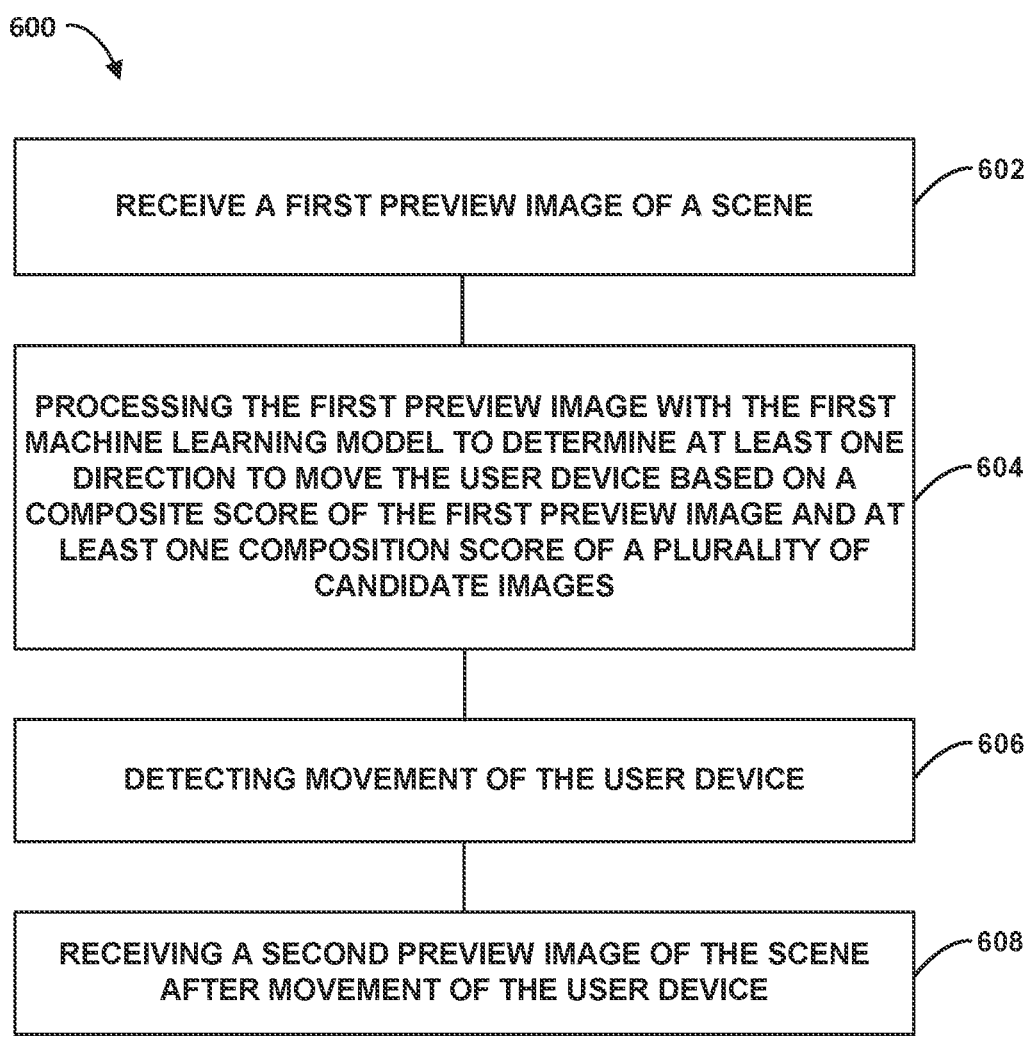
FIG. 6 depicts an illustrative flow diagram of an example method, in accordance with an example embodiment.

FIG. 6 illustrates example aspects of a method 600 for enabling a user of an image capture device (e.g., user device) to capture images of monuments, scenes, people, events, etc. that are of optimal composition and quality. The method 600 may analyze the composition of the images captured by the camera of the user device and provide suggestions or feedback to a user to capture images having improved image composition. The method 600 represents an example method that may include one or more operations as depicted by one or more blocks 602-608, each of which may be carried out by any of the embodiments shown in FIGS. 1 and 3, among other possible embodiments. In an example implementation, a user device or image capture device (e.g., a user device 100 or user device 300) performs the illustrated operations, although in other implementations, one or more other systems can perform some or all of the operations.

Those skilled in the art will understand that the flow diagrams or charts described herein illustrates functionality and operations of certain implementations of the present disclosure. In this regard, each block of the flow diagrams may represent a module, a segment, or a portion of program code, which includes one or more instructions executable by one or more processors for implementing specific logical functions or steps in the processes. The program code may be stored on any type of computer readable medium, for example, such as a storage device including a disk or hard drive.

In addition, each block may represent circuitry that is wired to perform the specific logical functions in the processes. Alternative implementations are included within the scope of the example embodiments of the present application in which functions may be executed out of order from that shown or discussed, including substantially concurrent or in reverse order, depending on the functionality involved, as would be understood by those reasonably skilled in the art. Within examples, any system may cause another system to perform one or more of the operations (or portions of the operations) described below.

Referring now to FIG. 6, the method 600 may be used to improve the composition of images captured by a camera of the user device, such as the user device 100 of FIG. 1. The user device may include a mobile device, such as a mobile phone, a tablet PC, a digital camera, a smart phone, or an augmented reality system, such as eye-glasses equipped with a camera. To capture images, the user of the user device may launch an application which activates the camera of the user derive. The camera may be configured to detect or capture real-time or preview images of a scene.

The preview images may be stored in a cache memory and rendered on a display device or screen of the user device. The user can therefore position the camera of the user device toward a scene and immediately view a picture of the scene on the display device of the user device. Thus, the preview image that is rendered on the display device may be a result of the camera being directed toward a scene or object of interest. The preview image may be continuously updated with new images from the camera of the user device, such that movement of the user device corresponds in real-time to movement of the image being detected or captured by the camera of the user device. As a result, the image being shown on the display device of the user device may be a real-time or preview image.

At block 602, the first preview image (e.g., a real-time image) may be received by a processing device of the user device. At block 604, the preview image may be processed using a first machine learning model to determine at least one direction to move the user device based on a composition score of the first preview image and at least one composition score of a plurality of candidate images. The first machine learning model be configured to analyze and/or process the first preview image for improving the composition of the image. The first machine learning model may compute a composition score that identifies a rating or quality of the composition of images captured or detected by the user device (e.g., real-time or preview images). For example, the first machine learning model may rate the composition quality of the first preview image.

Further, the first machine learning model may determine a composite score for a plurality of candidate images. Each of the plurality of candidate images may represent a simulated image of the preview image captured at different positions by the user device. Based on the composite score of the first preview image and the composition scores of the candidate images, the user device may determine whether to provide a suggestion to instruct the user to adjust a position or a setting of a user device. For example, the first machine learning model may evaluate and/or compare the composition score of preview image with the composition scores of each of the composition scores of the plurality of candidate images. Based on the comparison, the first machine learning model may provide an output to cause the user device to generate a suggestion to indicate that the image composition may be improved by adjusting the position or the camera settings of the user device. For example, the user device may provide a suggestion to the user to guide or instruct a user to move the user device in a particular direction or to adjust the camera zoom setting of the user device. The suggestions may be in the form of text, audio command, image overlays (animated or static), etc. that is presented to the user either on the display screen, through a speaker or through other input mechanism/devices.

In response to the suggestions to adjust the position or camera setting provided by the user derive, the user may elect to follow the suggestion or choose to ignore the suggestion. When the user elects to follow the suggestion, the user device may detect movement of the user device at block 606. The movement of the user device may be detected by the one or more sensors in the user device.

At block 608, the first machine learning model receives a second preview image of the scene after movement of the user device. For example, the first machine learning model may receive a new or updated image for the image that was originally rendered on a display device of the user device and may render the new image on the display device. At a result, the original image that was rendered may be discarded and the first machine learning module may begin to examine the new image for quality. Thus, in some embodiments, the user device may have to go through few iterations of adjustment the position and/or the setting of the user device before the preview or detected image meets an acceptable or particular quality for capturing of the image. The process may continue until the user device determines that no more adjustment are needed.

Once the first machine learning model determines that the prove image is of an acceptable composition, the user device may provide an informative message that is rendered on the display screen informing the user to proceed with the capturing of the image. In other embodiments, the user device may stop displaying a suggestion when the preview image is of an acceptable composition. In response, the user may trigger the capture of an image. The captured image may be saved in memory and may be accessed by a user over time. The resulting image is optimal in quality and composition, when the user follows the suggestions.

The various embodiments solve the problem associated with the capturing of mediocre images. Further, the various embodiments provide a novice or non-experienced user to take quality images of monuments, events, etc. It will be appreciated that the steps shown in FIG. 6 are meant to illustrate a method in accordance with example embodiments. As such, various steps could be altered or modified, the ordering of certain steps could be changed, and additional steps could be added, while still achieving the overall desired operation. The method can be performed by a client device, or by a server, or by a combination of a client device and a server. The method can be performed by any suitable computing device(s).

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

Figure 7:
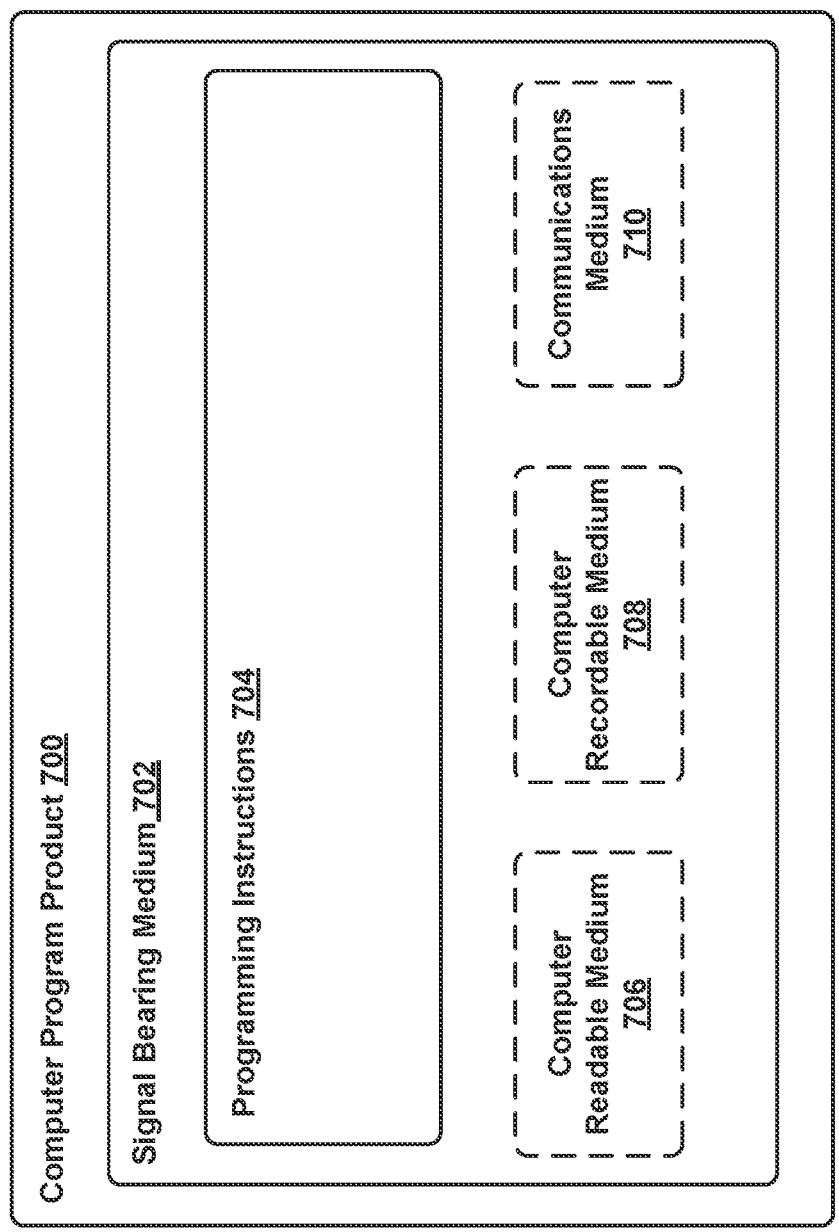
FIG. 7 is a schematic diagram of a computer program, according to an example implementation.

FIG. 7 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 700 is provided using signal bearing medium 702, which may include one or more programming instructions 704 that, when executed by one or more processors may provide functionality or portions of the functionality described above with respect to FIGS. 1-6. In some examples, the signal bearing medium 702 may encompass a non-transitory computer-readable medium 706, such as, but not limited to, a hard disk drive, a CD, a DVD, a digital tape, memory, components to store remotely (e.g., on the cloud) etc. In some implementations, the signal bearing medium 702 may encompass a computer recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Similarly, the signal bearing medium 702 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 702 may be conveyed by a wireless form of the communications medium 710.

The one or more programming instructions 704 may be, for example, computer executable and/or logic implemented instructions. In some examples, a computing device such as the user system 100 of FIG. 1 and the user device 300 of FIG. 3 may be configured to provide various operations, functions, or actions in response to the programming instructions 704 conveyed to the computing device by one or more of the computer readable medium 706, the computer recordable medium 708, and/or the communications medium 710.

The non-transitory computer readable medium could also be distributed among multiple data storage elements and/or cloud (e.g., remotely), which could be remotely located from each other. The computing device that executes some or all of the stored instructions could be another computing device, such as a server.

Example methods, systems, and apparatus are described herein in accordance with one or more aspects associated with improving the composition of captured images. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-Specific Integrated Circuits (ASICs), Application-Specific Standard Products (ASSPs), System-on-a-Chip systems (SoCs), or Complex Programmable Logic Devices (CPLDs).

Further, the above detailed description describes various features and operations of the disclosed systems, apparatus, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
   receiving, by a processing device of a user device, a first preview image of a scene;
   processing the first preview image using a first machine learning model to determine at least one direction to move the user device based on a composition score of the first preview image and at least one composition score of a plurality of candidate images, wherein each candidate image of the plurality of candidate images includes a first portion that comprises a subset of the first preview image and a second portion that comprises synthesized pixels;
   detecting, using the processing device, movement of the user device; and
   receiving, by the processing device, a second preview image of the scene after movement of the user device.

2. The method of claim 1, wherein the at least one direction corresponds to an upward direction, a downward direction, a right direction, a left direction, a rotational direction, or any combination thereof.

3. The method of claim 1, wherein the at least one direction is determined based on a candidate image of the plurality of candidate image having a highest composition score.

4. The method of claim 1, wherein the first machine learning model is trained using a second machine learning model, wherein the second machine learning model processes a training image to generate a plurality of simulated training images, each of the plurality of simulated training images including a portion of the training image.

5. The method of claim 4, wherein the second machine learning model selects a simulated training image from the plurality of simulated training images, the simulated training image having a highest composite score.

6. The method of claim 5, wherein the second machine learning model selects the highest composite score of the selected simulated training image as estimated ground truth data.

7. The method of claim 6, wherein the first machine learning model is trained with the estimated ground truth data.

8. The method of claim 1, wherein processing the first preview image using the first machine learning model further comprises causing a suggestion to be provided by the user device.

9. The method of claim 8, wherein the suggestion is provided based on a comparison of the composition score of the first preview image with each composition score of the plurality of candidate images.

10. The method of claim 8, wherein the suggestion is provided when at least one of the composite scores of the plurality of candidate images exceeds a composition score of the first preview image by a threshold value.

11. The method of claim 8, wherein the suggestion comprises audio information, visual information, graphical information, tactile information, or any combinations thereof.

12. The method of claim 8, further comprising displaying a representation of the suggestion on a display device of the user device.

13. The method of claim 8, wherein the suggestion indicates an adjustment to a camera zoom level of the user device, at least one direction to move or rotate the user device, or a combination thereof.

14. The method of claim 1, wherein the first machine learning model comprises a convolution neural network.

15. The method of claim 14, wherein the convolution neural network comprising one or more convolution layers, one or more pooling layers, or one or more fully connective layers.

16. The method of claim 1, wherein the user device comprises a mobile phone, a camera, a smartphone, a tablet personal computer, or eye glasses equipped with a camera.

17. The method of claim 1, wherein the subset of the first preview image is selected based on a simulated movement of the user device.

18. The method of claim 1, wherein the synthesized pixels are zero-padded pixels.

19. An apparatus comprising:
   memory;
   an image sensor; and
   one or more processors configured to:
     receive a first preview image of a scene;
     process the first preview image using a first machine learning model to determine at least one direction to move the user device based on a composition score of the first preview image and at least one composition score of a plurality of candidate images, wherein each candidate image of the plurality of candidate images includes a first portion that comprises a subset of the first preview image and a second portion that comprises synthesized pixels;
     detect movement of the user device; and
     receive a second preview image of the scene after movement of the user device.

20. A non-transitory computer-readable medium storing instructions, the instructions being executable by one or more processors to perform functions comprising:
   receiving a first preview image of a scene;
   processing the first preview image using a first machine learning model to determine at least one direction to move the user device based on a composition score of the first preview image and at least one composition score of a plurality of candidate images, wherein each candidate image of the plurality of candidate images includes a first portion that comprises a subset of the first preview image and a second portion that comprises synthesized pixels;

detecting movement of the user device; and
receiving a second preview image of the scene after movement of the user device.

\* \* \* \* \*